Feb. 27, 1968   G. H. ODOM   3,370,806
FISHING REEL

Filed July 25, 1966   3 Sheets-Sheet 1

INVENTOR.
GEORGE H. ODOM
BY *M N Chews*
ATTORNEY

Feb. 27, 1968   G. H. ODOM   3,370,806
FISHING REEL

Filed July 25, 1966   3 Sheets-Sheet 2

INVENTOR.
GEORGE H. ODOM
BY
*M. M. Cleare*
ATTORNEY

Feb. 27, 1968　　　　　　　G. H. ODOM　　　　　　　3,370,806
FISHING REEL
Filed July 25, 1966　　　　　　　　　　　　　　　3 Sheets-Sheet 3
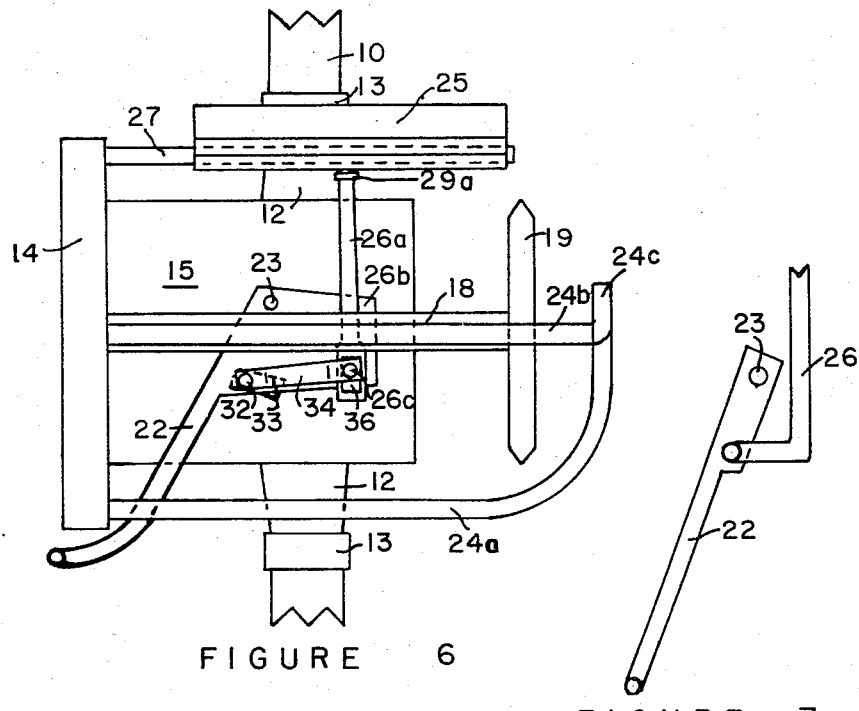
FIGURE 6
FIGURE 7
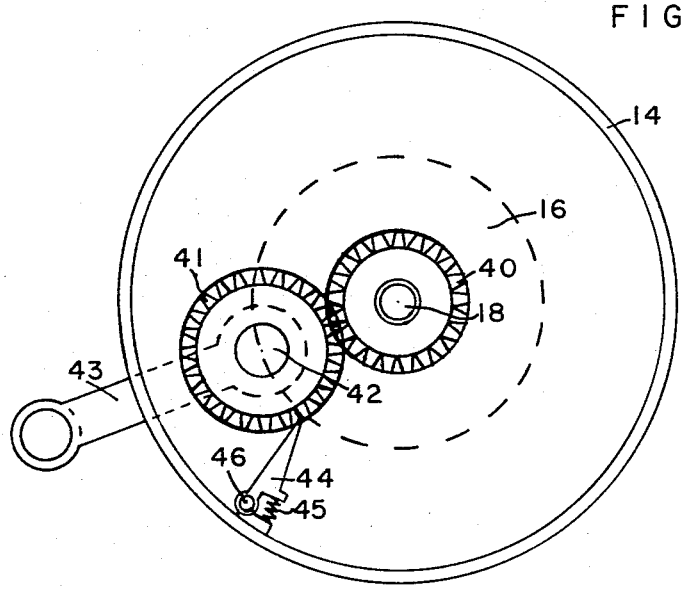
FIGURE 8
INVENTOR.
GEORGE H. ODOM
BY
*M. N. Chears*
ATTORNEY

United States Patent Office 3,370,806
Patented Feb. 27, 1968

3,370,806
FISHING REEL
George H. Odom, 208 Tuna, Galveston, Tex. 77550
Filed July 25, 1966, Ser. No. 567,515
11 Claims. (Cl. 242—84.2)

The present invention relates to fishing reels. More particularly, the present invention relates to a dual purpose fishing reel which combines features of the drum type reels and the spinning type reels.

With drum type fishing reels of the kind in general use, the fishing line is wound on a spool which is disposed substantially crosswise or perpendicular to the axis of the rod on which the reel is mounted. The primary advantage of the drum type reel is that considerably heavier objects on the end of the fishing line can be successfully wound in than with other types of reels. However, the drum type reel suffers at least two significant disadvantages. When casting with this type of reel, the spool must rotate to allow the fishing line to unwind. The friction resulting from rotation of the spool significantly reduces the distance which the fishing line can be cast. In addition, when the fishing line ceases to be carried outward by the cast, it is quite difficult and requires considerable skill to keep the rotating spool from continuing to rotate and thus, overrun the cast. Such overrunning by the spool results in "backlash."

The spinning type of fishing reel provides for the fishing line to spin or be stripped off of one end of the spool, generally, with the spool remaining stationary. Usually, the axis of the spool of the spinning type reel is substantially parallel to the rod to which the reel is attached. The spinning type reels have, to a large extent, overcome the problem of backlashing and have significantly lengthened the distance which a fishing line can be cast. However, the spinning type reel lacks much of the pulling strength which, as noted above, is characteristic of the drum type reel.

There have been a number of attempts at designing a fishing reel combining the best features of the drum and spinning type reels, particularly the rewinding strength of the drum type reels with the casting advantage of the spinning type reels. One means proposed for combining these advantages of the drum and spinning type reels is a reel which rotates with relation to the rod to which it is attached such that on casting the axis of the spool is substantially parallel to that of the rod while on rewinding of the line, the reel is rotated back to the customary position wherein the axis of the spool is perpendicular to that of the rod. While such reels as this afford to some degree a successful combination of the advantages of the drum and spinning type reels, they have found slight acceptance by fishermen.

Another type of reel proposed for combining the features of the drum and spinning type reels is one wherein the fishing line is spun or stripped off the end of the spool during casting at substantially a right angle to the axis of the rod but in alignment with the axis of the spool and is rewound perpendicular to the axis of the spool and in alignment with the axis of the rod. This is accomplished by placing a line guide means at or near the end of the spool for casting, the spool being positioned such that its axis is substantially perpendicular to that of the rod. For casting, the fishing line is placed over the line guide means such that the line travels off of the end of the spool, around the line guide means and then through the eyelets of the rod. For rewinding, the line is removed from the line guide means or the line guide means is rotated back into substantial alignment with the axis of the rod. Again, while such fishing reels provide a means of combining the advantages of the drum and spinning type reels, they have not been accepted to any extent as yet by fishermen. This is primarily because the reels of this type developed to present are usually relatively difficult to manipulate. In most instances with these reels, it is necessary to manually pick up the fishing line and place it over or remove it from the line guide means and/or rotate the line guide means with one hand while holding the fishing rod with the other. In addition, there is no provision on many of these reels for braking the spool on casting or for controlling the amount of line payed out by the cast.

It is an object of the present invention to provide a fishing reel which combines features of the drum type and spinning type fishing reels. Another object of the present invention is to provide a fishing reel possessing characteristics of both the drum type and the spinning type reels which may be rapidly and simply converted from operation as a spinning type reel to a drum type reel and vice versa. It is also an object of the present invention to provide a fishing reel which may be quickly and easily adjusted so that all movement of the fishing line onto the spool is effectuated by rotation of the spool or so that movement of the fishing line from the spool is off an end of the spool without rotation of the spool. An additional object of the present invention is to provide a fishing reel combining the advantageous features of the drum type and spinning type reel which may be readily converted from operation as a spinning type reel to operation as a drum type reel with only one hand. A further object of the present invention is to provide a fishing reel which may be operated as a drum type reel during rewinding of the fishing line and as a spinning type reel during casting which reel provides for simplified and improved control of the pay out of the fishing line on casting and which provides an improved means of guiding the fishing line from the spool on casting. Additional objects will become apparent from the following description of the invention herein disclosed.

The present invention which fulfills these and other objects, is a fishing reel comprising a frame adapted to be attached to a fishing rod, said frame including a base plate and a side plate, a spool for fishing line rotatably connected to said side plate, means for rotating said spool, a generally rounded line carrier arm, said line carrier arm being rotatably attached at substantially one end thereof to said base plate and extending outwardly and upwardly from said attachment to a point above the path described by said fishing line extending from said spool under fishing conditions, an actuating lever pivotally attached near the midpoint thereof to said frame, a substantially L-shaped linking means connecting said actuating lever and said line carrier arm such that said line carrier arm is rotationally responsive to pivotal motion of said actuating lever.

In order to more fully describe, as well as to illustrate the present invention, reference is made to the accompanying drawings which show various embodiments and details of the present invention.

FIGURE 6 is a top view of the fishing reel of FIGURE 4 but with the spool removed.

FIGURE 7 is a top view of a detail of the fishing reel of the present invention.

FIGURE 8 is a side view of the spool driving detail of the fishing reel of the present invention.

Figure 1:
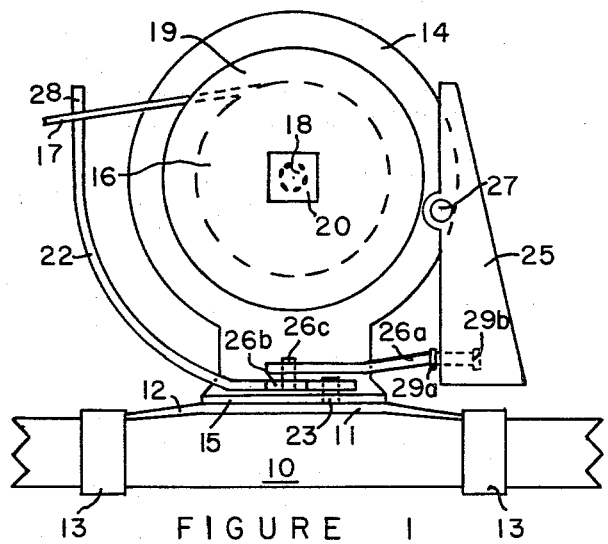
FIGURE 1 is a side elevational view of the fishing reel of the present invention in place on a fishing rod and shows the fishing reel positioned for rewinding of the fishing line.

In the drawings, like characters are used throughout to designate corresponding parts. To describe the drawings, the fishing reel of the present invention is shown mounted on a usual fishing rod 10. The fishing reel of the present invention is provided with a reel seat plate 11 including seating clips 12 at either end thereof, seating clips 12 being secured to fishing rod 10 by means of a pair of usual ring-type clamping members 13 which fit over the ends of the seating clips 12 to rigidly secure the fishing reel to fishing rod 10.

The fishing reel of the present invention comprises a reel frame which is generally L-shaped as viewed from the front. This reel frame is formed of a single side or end plate 14 and a base plate 15 which is attached to reel seat plate 11. Base plate 15 may be so designed as to function as the base plate of the reel and as reel seat plate 11 by providing the base plate with extended surfaces at either end as seating clips 12 for positioning on rod 10 by means of clamping members 13. Spool 16, adapted for receiving and storing fishing line 17, is rotatably connected to side plate 14 and rotatably positioned upon non-rotating supporting shaft 18 which is disposed along the axis of spool 16. Supporting shaft 18 acts as support for spool 16 and provides a surface upon which spool 16 may rotate for receiving fishing line 17. A second side or end plate 19, not a part of the reel frame, is provided for securing spool 16 in place. Second end plate 19 is held in place by a nut 20 affixed to the end of non-rotating supporting shaft 18.

Figure 4:
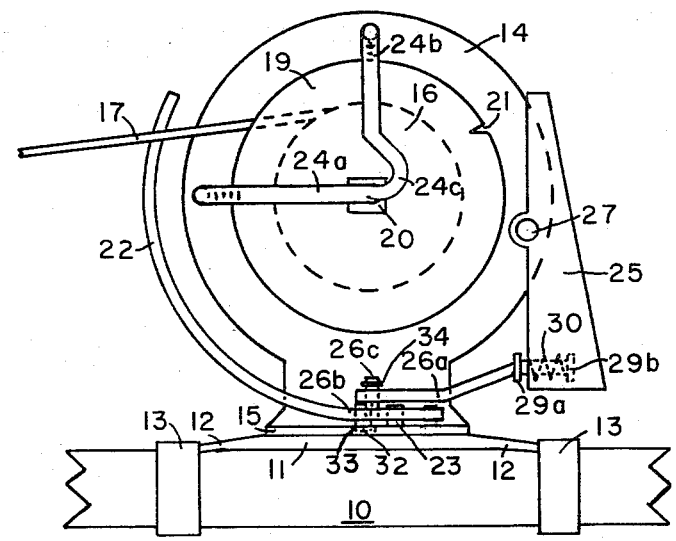
FIGURE 4 is a side elevational view of a preferred embodiment of the fishing reel of the present invention and shows this fishing reel positioned for rewinding of the fishing line.
Figure 5:
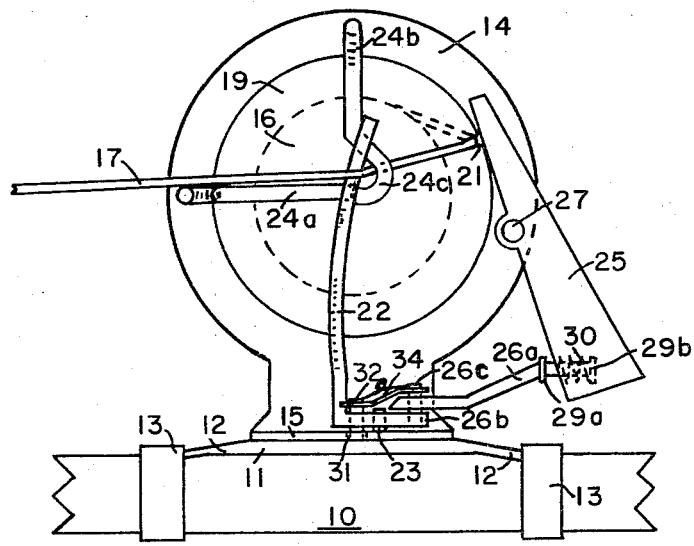
FIGURE 5 is a side elevational view of the fishing reel of FIGURE 4 but shows the fishing reel positioned for casting of the fishing line.

As noted above, second end plate 19 provides a means of securing spool 16 in place while nut 20 serves to hold second end plate 19 in place. The function of both of these elements may be readily combined into a single element by providing an end plate screw threaded to receive threads of supporting shaft 18. In the event the arrangement of a separate second end plate 19 and nut 20 is used, second end plate 19 may rotate along with spool 16 or may remain stationary with respect to the rotation of spool 16. In the preferred embodiment of the present invention, second end plate 19 does not rotate with spool 16. As illustrated in FIGURES 4 and 5, such a non-rotating second end plate 19 is provided with a notch 21 which receives fishing line 17 when the unwinding of line 17 during casting is braked.

Figure 3:
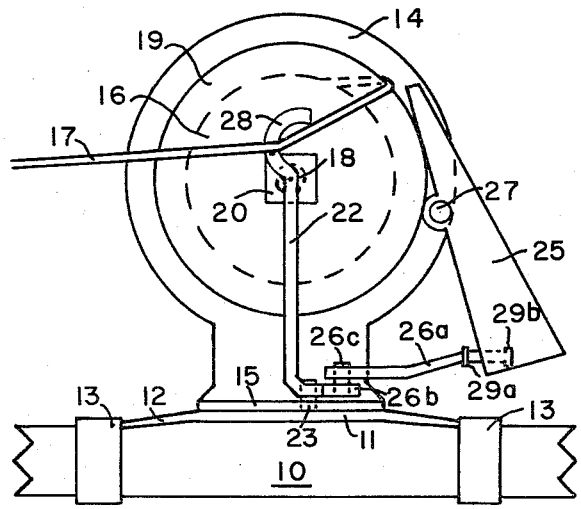
FIGURE 3 is a top view of the fishing reel of FIGURE 1 but with the spool removed.

A line carrier arm 22 is rotatably attached to base plate 15 by means of pin 23. This line carrier arm 22 is generally rounded in shape, extending outwardly and upwardly from its attachment to base plate 15 to a point above the path described by fishing line 17 extending from spool 16 under normal fishing conditions. In extending from spool 16 under normal fishing conditions, fishing line 17 follows a generally straight line from the upper surface of spool 16 to the rear eyelet (not shown) of fishing rod 10. Line carrier arm 22 is attached to base plate 15 so as to allow rotation of the upper, outer end of said carrier arm 22 from a point substantially in alignment with the plane in which side plate 14 lies and out of contact with fishing line 17, hereinafter referred to as the rewinding position, to a point substantially in alignment with the axis of spool 16, hereinafter referred to as the casting position. For simplifying understanding of the two positions of line carrier arm 22, reference is made to FIGURE 3 in which line carrier arm 22 is shown in rewinding position but in which broken line A—A denotes the casting position of line carrier arm 22. As line carrier arm 22 is rotated from the rewinding position to the casting position, fishing line 17 is carried from the normal path shown in FIGURES 1 and 4 to that shown in FIGURES 2 and 5.

Figure 2:
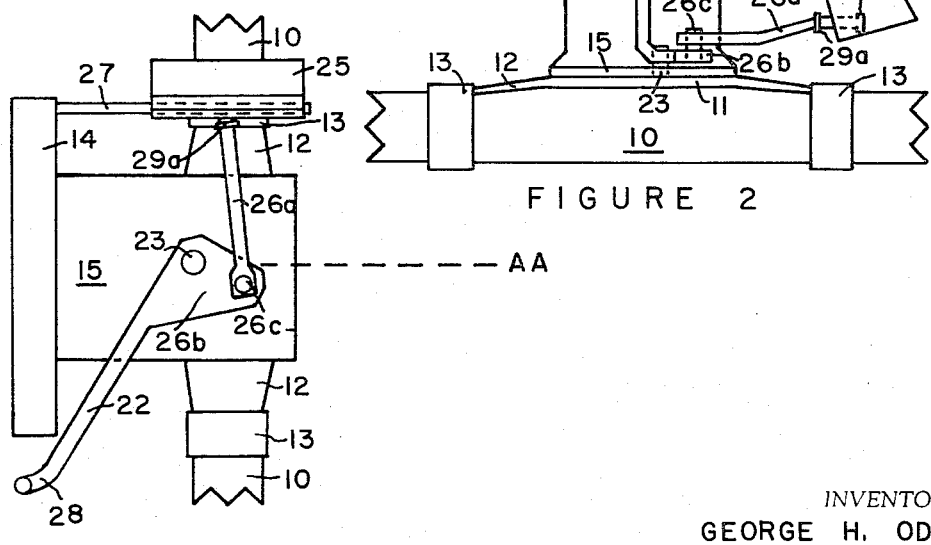
FIGURE 2 is a side elevational view of the fishing reel of FIGURE 1 but shows the fishing reel positioned for casting of the fishing line.

In the embodiment of the present invention shown in FIGURE 2, the upper, outer end of line carrier arm 22 is substantially semi-circular to provide a guide means 28. In another embodiment, line carrier arm 22 is substantially straight at its upper, outer end with, preferably, a slight bend or curvature, as shown in FIGURE 5, near its upper, outer end toward the rear of the fishing reel as viewed in casting position. With this preferred embodiment, a line retaining assembly, shown in FIGURES 4, 5, and 6 is provided to act with line carrier arm 22 in the discharge of fishing line 17 from spool 16 on casting.

The line retaining assembly includes two retaining bars 24a and 24b, each attached at one end to side plate 14 and usually joined at their other ends by a circular segment 24c. The retaining bar 24a is usually attachted to side plate 14 substantially at or just above or below the frontmost edge of side plate 14. From this point of attachment, retaining bar 24a extends away from side plate 14 generally parallel to the axis of spool 16 to approximately the end of spool 16 and then extends outwardly and rearwardly of the fishing reel around and outside of second end plate 19 in a generally circular manner to a point near the axis of spool 16. Retaining bar 24b usually is attached to end plate 14 at a point substantially at or just forward or rearward of the uppermost edge of side plate 14. From this attachment, retaining bar 24b extends away from side plate 14 generally parallel to the axis of spool 16 to approximately the end of spool 16 and then extends outwardly and downwardly in a generally circular manner around and outside of second end plate 19 to a point near the axis of spool 16. Retaining bars 24a and 24b are usually joined at their outer extremities by a substantially circular segment or bar 24c which lies largely in a plane parallel to that in which second end plate 19 lies.

To provide for rotation of line carrier arm 22 from the rewinding position to the casting position and back, line carrier arm 22 is connected to actuating lever 25 by linking member 26. Actuating lever 25 is pivotally connected to the fishing reel frame through pivotal attachment to shaft 27 which is disposed substantially parallel to the axis of spool 16 and is fixedly attached to the rear edge of side plate 14. Instead of being attached to and extending from side plate 14, shaft 27 may be attached to base plate 15 or to any other part of the fishing reel which will support the forces required to operate actuating lever 25. Actuating lever 25 preferably is substantially square as viewed from the rear of the fishing reel, and triangular shaped as viewed from the side and is preferably depressed in the rear surface thereof to receive the fisherman's thumb during operation of the fishing reel of the present invention. Actuating lever 25 is pivotally attached to shaft 27 at or near the midpoint of the lever.

In a particularly useful embodiment of the fishing reel of the present invention, shaft 27 extends from the rear edge of side plate 14 substantially parallel to the axis of spool 16 with the actuating lever 25 pivotally attached thereto, actuating lever 25 being so positioned on shaft 27 with respect to second end plate 19 that when actuating lever 25 is pivoted forward at its upper end, the upper end may be brought into contact with the inner surface of second end plate 19 near notch 21 if such notch is provided. Such positioning of shaft 27 and actuating lever 25 provides a means whereby the unwinding of fishing line 17 from spool 16 on casting may be effectively braked. When second end plate 19 is provided with notch 21, additional braking effectiveness is obtained as a result of fishing line 17 being pulled into the notch on braking.

The L-shaped linking means may comprise a single L-shaped member 26 as shown in FIGURE 7, or may comprise two or more members connected such as to function in the same manner as a single L-shaped member. FIGURES 1 through 6 particularly, show the linking means comprising two members 26a and 26b joined by means of pin 26c. Member 26b is fixedly attached to line carrier arm 22 and extends therefrom in a direction generally opposite from side plate 14 and substantially parallel to the surface of base plate 15 and is rotatably connected near its outer extremity to member 26a by means of pin 26c. Preferably, member 26a is disposed such as to be above member 26b at the point of their connection to one another. Member 26a is connected at its other end to actuating lever 25. The two members 26a and 26b provide and function as a single L-shaped linking means such as shown in FIGURE 7, with respect to causing line carrier arm 22 to be rotationally responsive to the pivotal movement of actuating lever 25. L-shaped linking member 26 shown in FIGURE 7, is rotatably connected directly to line carrier arm 22 at one end and to actuating lever 25 at the other, the latter connection not being shown in FIGURE 7.

In most instances, the L-shaped linking means is slidably connected to actuating lever 25. Such slidable connection provides for actuating lever 25 to be pressed into contact with the inner edge of second end plate 19 for braking the pay out of fishing line 17 on casting or, conversely, removed from contact with said surface of second end plate 19 without disturbing member 26a and, thus, line carrier arm 22. Preferably, as shown in FIGURES 4 and 5, the slidable connection includes stops 29a and 29b which are usually merely segments of enlarged diameter of linking member 26a, and a tension producing means 30, usually a spring, providing tension forcing the lower edge of actuating lever 25 forward toward the front of the fishing reel. The purpose of tension producing means 30 is to provide for removal of the upper edge of actuating lever 25 from close proximity to spool 16 and second end plate 19 when thumb pressure is removed from actuating lever 25, thereby removing the possibility of fishing line 17 contacting actuating lever 25 before it is desired to brake the pay out of the line on casting.

Wtih reference to the embodiment of the present invention shown in FIGURES 4, 5, and 6, means are provided for maintaining line carrier arm 22 in the winding and casting positions when in use in such positions. Such means comprise a receiving hole 31 in base plate 15 and a tapered groove 33, also in base plate 15, a slidable pin 32 passing through line carrier arm 22, a connecting bar 34 connected at one end to the upper end of slidable pin 32 and rotatably and slidably connected at the other end to the upper surface of linking member 26a through attachment to pin 26c which passes through slot 36 in linking member 26a, and a tension producing means 37 operatively connected to slidable pin 32 such as to force slidable pin 32 downward. Connecting bar 34 is connected to slidable pin 32 in a horizontal plane lower than that in which its connection to pin 26c lies. Tension producing means 37 must be so adjusted that it places only a slight positive pressure on slidable pin 32 in order that slidable pin may be readily withdrawn from receiving hole 31 or tapered groove 33.

In operation, line carrier arm 22 is rotated from the rewind position to the casting position and slidable pin 32 is forced into receiving hole 31 in base plate 15 by tension producing means 37 thereby locking line carrier arm 22 against rotational motion. When the lower edge of actuating lever 25 is pressed forward against stop 29a, linking member 26a is caused to travel forward such that its leading edge strikes the under inclined surface of connecting bar 34 thereby causing the end of connecting bar 34 to which slidable pin 32 is attached to be forced upward. In this manner, slidable pin 32 is withdrawn from receiving hole 31 thereby unlocking line carrier arm 22 from the casting position. Substantially concurrently with the withdrawal of slidable pin 32 from receiving hole 31, the rear surface of slot 36 contacts pin 26c thereby causing pin 26c to be forced forward which in turn causes line carrier arm 22 to be rotated back towards the rewinding position. As line carrier arm 22 is rotated back into the rewind position, pin 32 is forced into and slides down the inclined bottom surface of tapered groove 33 to thereby provide a means of frictionally restraining line carrier arm 22 in the rewind position. When actuating lever 25 is pivoted to rotate line carrier arm 22 back to the casting position, and line carrier arm 22 is caused to so rotate, pin 32 is caused to slide up the inclined bottom surface and out of tapered groove 33.

In order to describe particular means of providing rotational motion to spool 16 for rewinding operations, reference is made to FIGURE 8 which illustrates such means. In FIGURE 8, spool 16 is connected for movement with spool pinion gear 40 which, along with spool 16, is rotatably mounted on non-rotating supporting shaft 18 and meshes with drive gear 41 which is secured in driven relationship with drive shaft 42. To drive shaft 42 is attached crank 43. If desired to maintain spool 16 non-rotating on casting, a stopping lever 44 is provided and is pivotally attached at one end thereof to side plate 14 and engages drive gear 41 at its other end. Tension is provided by spring 45 to hold stopping lever 44 in contact with drive gear 41. Functionally, stopping lever 44 will permit drive gear 41 to be rotated in one direction for rewinding operations but will not permit drive gear 41 to be rotated in the opposite direction on casting. Other means of maintaining spool 16 non-rotating on casting may be provided without departing from the spirit and scope of the present invention.

What is claimed is:

1. A fishing reel comprising a reel frame adapted to be attached to a fishing rod, said reel frame including a base plate and a side plate, a spool for fishing line rotatably connected with said side plate, means for rotating said spool, a generally rounded line carrier arm, said line carrier arm being rotatably attached at substantially one end thereof to said base plate and extending outward and upward from said attachment to a point above the path described by said fishing line extending from said spool under fishing conditions, an actuating lever pivotally attached near the midpoint thereof to said reel frame, a substantially L-shaped linking means connecting said actuating lever and said line carrier arm such that said line carrier arm is rotationally responsive to pivotal motion of said actuating arm.

2. The fishing reel of claim 1 wherein said spool is rotatably connected to said side plate by means of a non-rotating shaft passing along the axis of said spool, said spool being rotatably mounted on said non-rotating shaft.

3. The fishing reel of claim 2 wherein the means for rotating said spool comprises a spool pinion gear rotatably mounted on said non-rotating shaft, said spool being secured in driven relationship with said spool pinion gear, a drive gear engaging said spool pinion gear, means for rotating said drive gear.

4. The fishing reel of claim 2 wherein a second side plate is connected to said non-rotating shaft at the end of said shaft opposite said side plate of said reel frame.

5. The fishing reel of claim 4 wherein said second side plate is non-rotating.

6. The fishing reel of claim 5, said actuating lever having a portion engageable with an axially inner surface of said second side plate when manually moved, said second side plate including a notch in the upper rear edge thereof at a point substantially level with the point where said actuating lever will contact the inner surface of said second side plate if pivoted into contact therewith.

7. The fishing reel of claim 1 wherein said line carrier arm is slightly curved near its upper outer end and wherein a line retaining assembly is provided to act with said line carrier in the discharge of said fishing line on casting.

8. The fishing reel of claim 7 wherein said line retaining assembly comprises two substantially parallel retaining bars, each of said retaining bars being connected at one end thereof to said side plate of said reel frame, one of said retaining bars attached to said side plate near the uppermost edge of said side plate and the other of said retaining bars being attached to said side plate near the frontmost edge of said side plate, the other ends of said retaining bars being connected outside of said reel frame and near the axis of said spool by a generally circular segment.

9. The fishing reel of claim 1 wherein said L-shaped linking means comprises two linking members which comprise a first linking member fixedly attached to said line carrier arm and rotatably connected to the second of said linking members, said second of said linking members being slidably connected to said actuating lever.

10. The fishing reel of claim 9 wherein a tension producing means is provided in connection with said second linking member and said actuating lever whereby the lower edge of said actuating lever is forced forward.

11. The fishing reel of claim 9 wherein a means for locking said line carrier arm in casting and rewinding positions is provided which means comprises a vertically aligned pin slidably engaged with said line carrier arm, a receiving hole in said base plate positioned for receiving said pin when said line carrier arm is in casting position, a tapered groove in said base plate positioned for receiving said pin when said line carrier arm is in rewinding position, a connecting bar rotatably attached at one end to said pin and attached at its other end to a second pin which passes through and rotatably connects said two linking members of said L-shaped linking means, said second of said linking members being provided with a slot through which said second pin passes, and a tension producing means operatively connected to said pin tending to force said pin downward.

References Cited
UNITED STATES PATENTS 2,767,934  10/1956  Miller _____ 242—84.2
2,866,291  12/1958  Duell _____ 242—84.2 XR BILLY S. TAYLOR, *Primary Examiner.*